United States Patent [19]

Lindmark

[11] Patent Number: 4,866,425
[45] Date of Patent: Sep. 12, 1989

[54] DETECTOR FOR SENSING AND/OR MEASURING PASSING OBJECTS

[75] Inventor: Curt Lindmark, Djursholm, Sweden

[73] Assignee: Diantek AB, Sollentuna, Sweden

[21] Appl. No.: 191,114

[22] Filed: May 6, 1988

[30] Foreign Application Priority Data

May 6, 1987 [SE] Sweden ................. 8701872

[51] Int. Cl.<sup>4</sup> ............... G08B 13/18; G08B 29/00; G08B 21/00
[52] U.S. Cl. ................ 340/556; 340/511; 340/630; 340/693
[58] Field of Search ........... 340/556, 630, 568, 511, 340/587, 693

[56] References Cited

U.S. PATENT DOCUMENTS

| 4,266,219 | 5/1981 | Foster et al. | 340/630 |
| 4,317,113 | 2/1982 | Honma | 340/630 |
| 4,384,280 | 5/1983 | Haag | 340/556 |

FOREIGN PATENT DOCUMENTS

| 0021163 | 1/1981 | European Pat. Off. |
| 0194243 | 9/1986 | European Pat. Off. |
| 86/01061 | 2/1986 | PCT Int'l Appl. |
| 204659 | 8/1939 | Switzerland |
| 2176599 | 12/1986 | United Kingdom |
| 2183825 | 6/1987 | United Kingdom |

*Primary Examiner*—Glen R. Swann, III
*Attorney, Agent, or Firm*—A. W. Breiner

[57] ABSTRACT

A detector for sensing or measuring objects passing a measurement path (5) has a detection element (6), the output signal of which is a function of objects discovered in the measurement path. The output signal is fed to an amplifier and filter circuit (7-9), the output of which is connected to two parallel integration ciruicts (11, 12). The integration circuits have time constant ($\tau_{SH}$, $\tau_L$) of different magnitudes, and their output signals are fed to a comparator (13) for obtaining an operative signal indicating the presence of an object in the measurement path, this signal being unresponsive to long-duration fluctuations in the detector's operating conditions, e.g., dirtying of the detection element. The detector includes a dirtiness alarm with the threshold response adjustable to a long-time-constant integrator output.

10 Claims, 2 Drawing Sheets

DETECTOR FOR SENSING AND/OR MEASURING PASSING OBJECTS

TECHNICAL FIELD

The present invention relates to detector for sensing and/or measuring objects passing the measuring path of the detector. A detector element is disposed at one defining surface of the measuring path for catching radiation sent from a beam source, which may be the objects which are to be sensed and/or measured, or a source connected to the detector circuit and emitting optical or other radiation. The detector element is connected to an electrical amplification and filter circuit, which is included in the mentioned detector circuit and is connected to two integration circuits. The output signals from both integration circuits are fed to a comparator. The output signal received from the comparator at an object alarm circuit indicates the possible presence of objects in the measuring path of the detector independent of fluctuation of a durable nature in the operating conditions of the detector.

BACKGROUND ART

Such detectors area already known within various fields of activity, from sensing objects passing by on a continuous conveyer to sensing particles in flowing air or liquid media, see e.g. European patent applications Nos. 0 021 163 and 0 194 243. A problem said to be solved by these known detectors is that their operational signal will be compensated for changes dependent on ageing of the components used, temperature variations and dirtyness of the radiation source and/or the detector element.

In connection with a digitilized smoke detector it has been proposed that a separate signal is taken out for indicating that the function degree of the detector is restricted to an inacceptable level, see e.g. U.S. Pat. No. 4,317,113. The known detector having dirtyness compensation and level detection includes a rather complicated circuit arrangement. Furthermore, the signal indicating the dirty degree is taken out at a point downside of a special comparator unit to be able to be used as a function alarm via a complicated circuit net. It involves a complicated and uneconomic arrangement for obtaining an accurate level indication.

SUMMARY OF INVENTION

The purpose of the detector according to the present invention is to suggest an improved and simplified circuit arrangement to obtain reliable and accurate signal indications with respect to detected objects as well as to the present dirty degree.

The purpose is complied with by having the output of the integrator circuit with long time constant in the detector according to the invention connected to besides one of the inputs of the comparator also to a reference level means included in the object alarm circuit to determine the threshold level to be reached before indicating the presence of an object, and to an amplifier within the function alarm circuit which by being below a predetermined threshold level generates an alarm signal indicating too great a degree of dirtiness.

Thus, to use the output already present at the one integrator circuit, which in known manner is coupled to the comparator to be compared with the output from the other integrator circuit, for further two purposes it has been possible by the present invention to simplify the circuit. Simultaneously a greater degree of precision has been obtained by having one and the same output signal used directly for these three purposes.

The use of the word "object" in this application is intended to apply to all that can be sensed by a detector of the kind in question. Accordingly the "object" may be goods such as glass bottles on manufacturing or filling lines, packets or letters on sorting conveyors, details conveyed on belt conveyors for assembly etc. The "object" can equally as well constitute smoke particles in ventilation air, fibres in liquid conveyers etc. Other categories of "objects" intended to be covered are self-emitting particles in blood, burner flames in an oil burning furnace etc.

Further developments and preferred embodiments are defined by the dependent claims.

The detector in accordance with the invention has been implemented with the goal that faulty sensing and faulty measurement shall be eliminated, but that high sensitivity shall be retained in all situations. Faulty signals are caused by external interference, by the sensitiveness of the detector decreasing with the degree of dirtying and by the ageing of the components included. However, the inventive detector has constant sensitivity, irrespective of the degree of dirtying or the ageing of the components. In addition, its immunity to outside disturbances is uniquely high. The following general advantages can thus be noted for the inventive detector:

(a) It is able to function with a very high degree of dirtying, up to 99%, with retained sensitivity and an automatic linear compensation;

(b) It has an analogue output for continuous measurement of the degree of dirtying. Using a relay output, a service alarm can be obtained when dirtying has attenuated the useful signal by 90%, for example;

(c) It has great insensitivity to disturbances, e.g. such as can be caused by thunder. Accordingly, it does not give any "false alarms" due to:
dirty detector element
temperature variations, even rapid such variations
normal (continuous) illumination
mechanical shocks and vibrations
power supply disturbances transients or power failures
currents in earth loops
spark discharges (ESD)
radio-frequency interference (EMI)
electromagnetic pulses (EMP);

(d) It also retains its sensing or measuring ability during exposure to disturbances.

When the detector is implemented for use as a smoke detector in such as ventilation ducts, there are further advantages to the general ones listed above, these advantages being:

(e) It is able to detect all visible smoke, even completely black smoke;

(f) It has constant sensitiveness for the detection of smoke within a large air speed range, i.e. 0.2–20 m/sec. Smoke from a smouldering fire in still air (0 m/sec.) can also be detected, when the smoke is often heterogeneous due to the thermic conditions present in ventilation ducts;

(g) Fitting the detector into a ventilation duct and adjusting the inwardly projecting length is simple, and only one hole in the ducts is needed;

(h) It is easy to handle since it lacks radioactive isotopes;

(i) It is simple to clean, when needed after a service alarm has been given. It is estimated that cleaning does not need to take place more often than every fifth year, even in a dirty environment.

BRIEF DESCRIPTION OF THE DRAWING

The detector in accordance with the present invention will now be described in more detail below with reference to the accompanying drawings, which illustrate a preferred embodiment of the detector, which for this example has been designed for smoke detection in ventilation ducts. It should be emphasized, however, that the drawing and description in conjunction therewith solely relate to an embodiment example where this has been applied to a conceivable field of use. On the drawings.

DESCRIPTION OF THE PREFERRED EMBODIMENT

Figure 1:
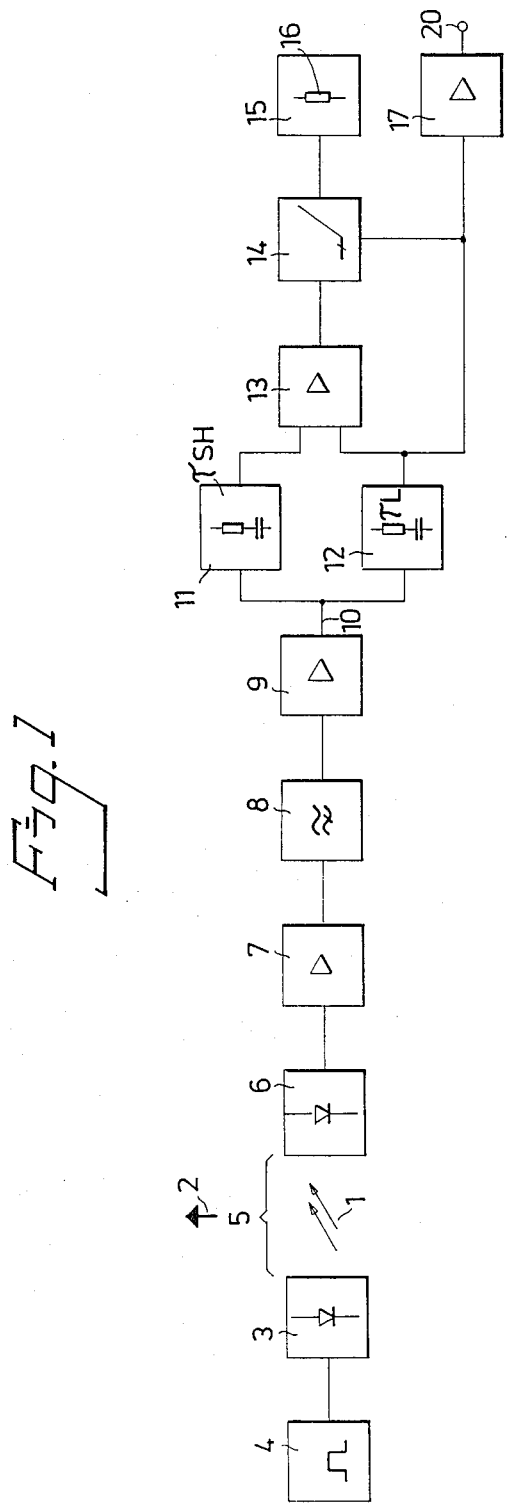
FIG. 1 is a block diagram for a smoke detector in accordance with the invention.

In FIG. 1 a block diagram is shown for a variant of the detector in accordance with the invention applied to a field of use, namely as a smoke detector in ventilation ducts. Pulsed IR light is used as measurement radiation 1 through the air stream 2. The IR light source 3 and its oscillator 4 are arranged at one defining surface of the measurement path 5, and an IR detector element 6 is arranged at the opposing defining surface of the measurement path 5.

The detector element 6 is connected to a first amplifier 7 and a high-pass filter 8 for eliminating noise. The output signal from the high-pass filter 8 is fed to a second amplifier 9, the output 10 of which is connected to two parallel integration circuits 11, 12. The integration circuits 11, 12 have different time constants $\tau_{SH}$ and $\tau_L$ respectively. Suitably, the relationship between $\tau_S$ and $\tau_L$ is between 1:100 and 1:1000. The short time constant $\tau_{SH}$ must not be too long, since the fluctuations cannot then be registered, but neither shall it be too short, since the integration circuit 11 then becomes too sensitive.

The output signals from the integration circuits 11, 12 are fed to a comparator 13, which sends a signal to a discriminator 14. When an object, in this case smoke, is present at the measurement path 5, the discriminator 14 sends a pulse signal to the operational signal output 15 of the detector, denoted here by a current load 16.

The output signal from the integration circuit 12 having the long time constant $\tau_L$ is also utilized for determining the degree of dirtying for the detector. Accordingly, its analogue output signal is taken to an amplifier 17, the output signal level of which constitutes a measure of the detector dirtyness.

The analogue output signal from the integration circuit 12 is also utilized as the threshold signal for the discriminator 14.

Figure 2:
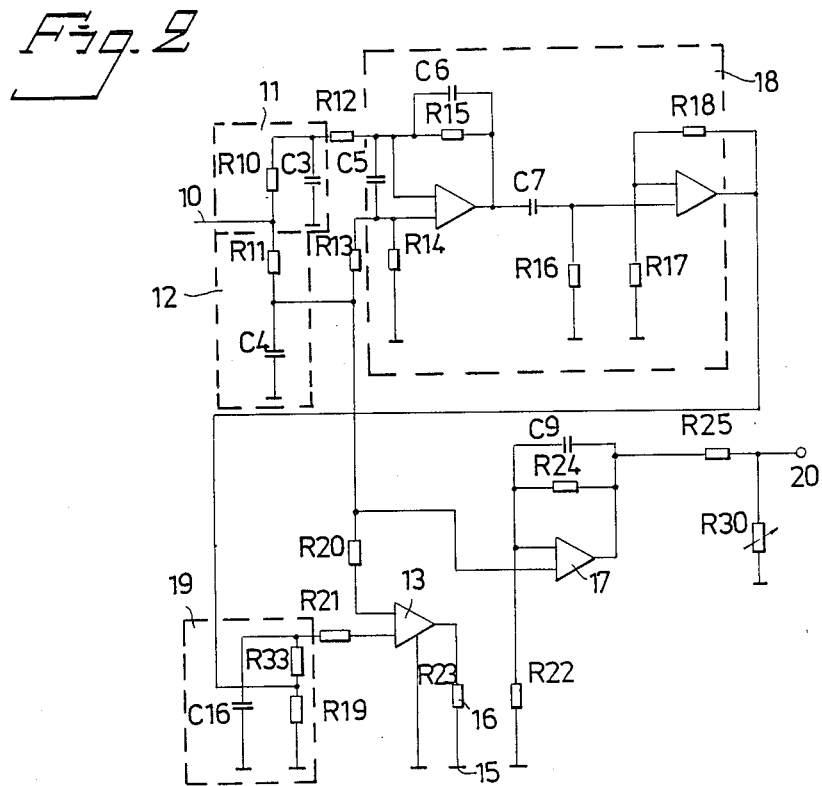
FIG. 2 is a circuit diagram for an embodiment of the electrical circuit characterizing the present invention, and FIG. 3 schematically illustrates an embodiment of the mechanical implementation of a smoke detector formed in accordance with the invention.

An embodiment of the detector is illustrated in FIG. 2 in a more detailed electrical circuit diagram for the part of the detector circuit constituting what is characteristic for the invention. Accordingly, the output 10 of the second amplifier 9 (FIG. 1) is illustrated, being connected to the parallel integration circuits 11, 12. As will be seen from FIG. 2, in this embodiment each integration circuit 11, 12 includes respectively a resistor R10 and R11 and a capacitor C3 and C4. The time constants $\tau_{SH}$ and $\tau_L$ of the circuits are determined here by the value of the capacitors C3, C4, which have been given the value 1μf and 1000μf. The integration circuit 11 with the short time constant $\tau_{SH}$ has its output connected via the output resistor R12 to an amplifier and filter circuit 18, the output signal of which is taken to an integration network 19. The ingration network 19 corresponds in this circuit to the discriminator 14 in the block diagram according to FIG. 1, and is used to set the reference lvel, and the output of the network is connected to one input of the comparator 13. The second input of the comparator 13 is connected to the output of the integration circuit 12 with the long time constant $\tau_L$. The operative signal for the presence of objects is taken out via the current load 16, here depicted as a resistor R23.

As in the block diagram according to FIG. 1, there is an output terminal 20 for obtaining via an analogue output signal a measure of the degree of dirtyness for the detector. The terminal 20 may be connected to an indicator lamp in an alarm centre, which has a predetermined percentage, e.g. 90%, for the degree of dirtyness this percentage being set by the resistor R30, the lamp indicating that cleaning of the detector element 6 and/or the IR source 3 is required. The operative signal output 15 is also suitably connected to the alarm centre for actuating a smoke-indicating alarm means there.

Figure 3:
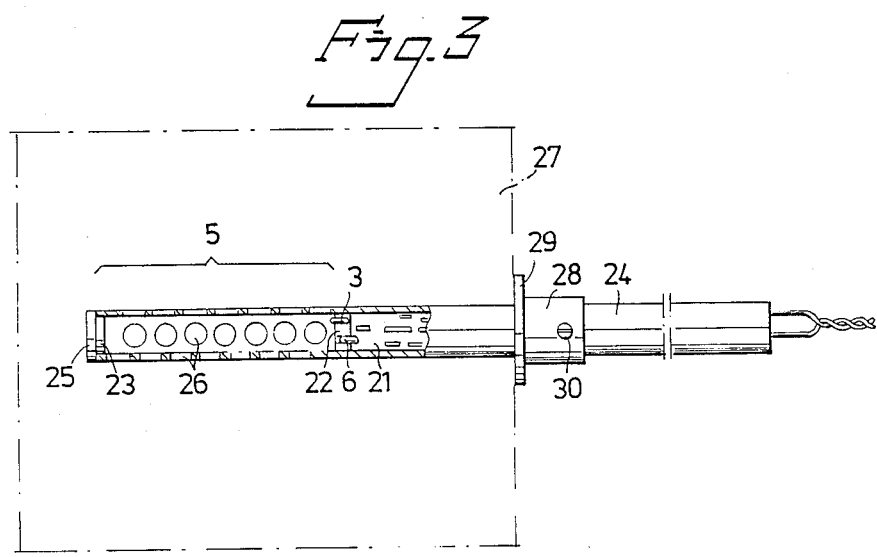

A practical embodiment of the detector in accordance with the invention is schematically illustrated in FIG. 3, the implementation being for smoke detection in this case as well. The electrical circuit, corresponding to the block diagram in FIG. 1 and circuit diagram in FIG. 2, is arranged on a printed circuit board 21. The IR light source 3 as well as the IR detector element 6 are arranged at one end surface of the measuring path 5, where the circuit board 21 is terminated by temperature compensating means 22 in the form of a brass block. Both the IR light source 3 and the IR detector element 6 are placed in the brass block 22. The other end surface of the measuring path 5 is formed by a reflector surface 23.

A cylindrical tubular casing 24, preferably of aluminum, surrounds the circuit board 21 and measuring path 5 and is terminated by an end closure 25, the internally disposed surface of which constitutes said reflector surface 23. The tubular casing 24 has a plurality of rows of holes around its circumference The number of the rows corresponds to the length of the measuring path 5. Each row preferably includes seven holes 26, these holes in a row being staggered relative the holes in adjacent rows by a predetermined spacing, preferably corresponding to one third of the hole diameter for six rows.

In FIG. 3 the detector is shown fitted to a ventilation duct 27 by being inserted in an opening in the duct wall. Attachment of the detector is by a flanged collar 28, surrounding the casing 24, and with its flange 29 sealing the opening in the duct wall. The position of the collar 28 on the casing 24 is adjustable and can be fixed by a set screw 30. The outwardly projecting end of the casing 24 has electrical connection leads including the signal outputs 15 and 20 and power supply to the electrical circuit.

The smoke detector, accounted for above as an example of the invention, operates according to the obscuring principle and is intended for smoke detection in ventilation ducts, where it even detects black smoke. The smoke passes through an infrared optical beam. An IR LED is used as the IR source 3, and the detector element 6 is an IR photo diode. The optical beam is attenuated if smoke penetrates into it. The IR photo diode detects a decreased received optical effect caused by smoke absorbing part of the IR light. If the derivatives of the optical signal change are sufficiently great during a given measuring time a smoke alarm is indicated. This takes place when the smoke derivatives exceed a preset (via 14 or 19) threshold value in the smoke detector during measuring time. The optical signal obtained is analyzed in the measurement electronics by being integrated in 11 and 12 during a short and a long time respectively. If the difference between these two signals with different integration times is sufficiently great the alarm is triggered. The time sequences for dirtyness compared with smoke detection are entirely dissimilar. By measuring these two sequences both the degree of dirtyness and presence of smoke can be registered.

The signal obtained by integration during a long time, i.e. with the large time constant $\tau_L$, is equal to the average value of the transmission of the optical signal. This analogue output signal 0–10 V is linear with the degree of dirtyness on the optocomponents. Full transmission without dirtyness gives 10 V. With increased dirtyness the analogue signal falls successively towards 0 V, which corresponds to a completely blocked beam.

A service alarm is triggered, e.g. when only 10% transmission (90% dirtyness) remains, i.e. when the analogue signal has fallen to 1 V.

In this way the detector can detect smoke with retained sensitivity, despite a very high level of dirtyness, and as much as 99% dirtyness. This corresponds to a transmission of only 1% of the original optical effect for a clean detector. The ability to detect smoke is thus retained by a good margin, even after the service alarm has been triggered. This guarantees high operational reliability without false alarms.

Temperature variations for both high and low temperatures are also compensated for by this meausuring procedure of always allowing the means level of the optical signal to be the reference measured against when the difference is formed against the short integration time. It contains signal information as to the rapid optical fluctuations occurring by the smoke having different, spotty local optical density. Such local spotty variations in smoke concentration occur due to thermal condition and varying densities of air and smoke. This effect is amplified in a flowing medium, e.g. the air stream in ventilation ducts 27. In such situations there is friction and light reflection in air layers at difference pressures, air speed or temperature. To enable measuring these small and rapid alterations in the optical transmission, an optical detector is needed which can resolve these signals in time, i.e. a detector in accordance with the invention. (In optical detectors of the prior art, these rapid fluctuations are normally integrated to, and then cannot be time-resolved).

The detector has been described hereinbefore in detail in connection with an embodiment for a conceivable field of use. As already mentioned, the principle for the detector can be used in widely different fields of use. Although optical IR radiation is a preferred detection means, the principle of the invention is also applicable to other radiation. It has been stated hereinbefore that the position of the light source is not critical for the invention, which operates either directly or indirectly, i.e. with a reflected radiation beam. It is not necessary to use a special reflector for reflection, and the latter can take place against the object which is to be sensed. An other rconceivable radiation source is the object itself. One skilled in the art will easily understand that the diagrams discussed here can be modified without departing from the inventive concept. The description given hereinbefore and the embodiment exemplified on the drawings are therefore not to be regarded as restricting the invention and the scope thereof defined in the following claims.

I claim:

1. A detector intended for sensing and/or measuring objects passing the detector measuring path, where at one defining surface of which a detector element is disposed for catching radiation sent from a beam source, said detector element being connected to an electrical amplifier and filter circuit and the signal from said circuit being taken to two integration circuits having mutually different time constants ($\tau_S$, $\tau_L$), the output signals of which are taken to a comparator for obtaining of an output signal at an object alarm circuit which indicates the possible presence of an object irrespective of long duration fluctuations in the operating conditions of the detector, said detector being characterized in that the output from the integration circuit with the long time constant ($\tau_L$) also is connected to a reference level means included in the object alarm circuit and being connected to the output of the comparator for determination of the threshold level to be reached before indicating presence of an object, and to an amplifier within a function alarm circuit which sends an analogue output signal indicating the long duration operational conditions of the detector, such that when the signal falls below a threshold level an alarm signal is triggered.

2. The detector according to claim 1, characterized in that said reference level means is in the form of a discriminator coupled between the comparator and an alarm signal output for detecting the presence of an object.

3. The detector according to claim 1, characterized in that said reference level means is in the form of an integration network including two serially coupled resistors coupled in parallel with a capacitor and having an input signal received through an amplifier and filter circuit from the integration circuit with long time constant ($\tau_L$).

4. The detector according to claim 3, characterized in that the relationship between the time constants ($\tau_S$, $\tau_L$) of the integration circuits is between 1:100 and 1:1000.

5. The detector according to claim 1, characterized in that the radiation source and the detector element are arranged in a common, temperature-compensating means, one side of which forms the end surface of the detector measurement path passed by the objects which are to be sensed and/or measured, the detector element being adapted for sensing the reflected radiation from the radiation source.

6. The detector according to claim 5, characterized in that the temperature compensating means comprises a metal block.

7. The detector according to claim 5, characterized in that the other end surface of the measurement path is formed by a reflector, the objects passing both the forward and return radiation, and in that the temperature compensating means is arranged at the end of a printed circuit board which carries the electrical circuits of the detector.

8. The detector according to claim 7, and intended for use in such as ventilation ducts, characterized in that the printed circuit board is accommodated in a tubular casing, with its outer end closed with the aid of a body forming with its inward surface said reflector, the casing having along its cylindrical surface uniformly distributed holes, the extension of which in the longitudinal direction of the casing corresponding to the length of the measuring path.

9. The detector according to claim 8, characterized in that the uniformly distributed holes form six rows with seven holes in each, the holes in one row being staggered by a distance corresponding to ½ of the width of the hole relative the holes in adjacent rows.

10. The detector according to claim 5, characterized in that the metal block is made from brass.

* * * * *